Patented Oct. 28, 1941

2,260,800

UNITED STATES PATENT OFFICE 2,260,800

PROCESS OF MAKING TERTIARY BUTYL MALONIC ACID

Milton T. Bush, Nashville, Tenn., assignor to Mallinckrodt Chemical Works, St. Louis, Mo., a corporation of Missouri No Drawing. Application May 1, 1939, Serial No. 271,165

6 Claims. (Cl. 260—537)

This invention relates to processes of making substituted malonic acids, and with regard to certain more specific features, to processes of making tertiary butyl malonic acid.

Among the several objects of the invention may be noted the provision of processes of the class described which, proceeding from readily-available starting materials, produces with relative facility a relatively good yield of the desired tertiary butyl malonic acid. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Dox and Bywater, in the Journal of the American Chemical Society, vol. 58, page 731 (1936), report the preparation of tertiary butyl malonic acid, but indicate a yield, expressed in terms of the ethyl ester, of only 6%. A principal object of the present invention is to prepare the desired acid with a much improved yield, as the reported 6% yield is so low as to be commercially grossly impracticable.

I have found that carbonation of the product of the interaction of sodium tertiary-butyl acetate and phenylsodium gives better than a 45 per cent yield of tertiary-butyl malonic acid. The precise manner in which the reactions proceed is not definitely known, but apparently the following equations afford an explanation of at least hypothetical value:

As a starting material I use tertiary-butyl acetic acid, which may be obtained in pure form according to the procedure described in Whitmore et al. Patent No. 2,004,066, dated June 4, 1935. This is converted to its sodium salt, by reaction with metallic sodium, probably according to the reactions:

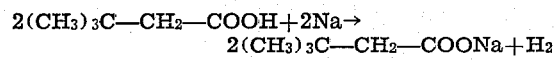

The other starting material, phenylsodium, is prepared (usefully in the same reaction mixture) by treating metallic sodium with amyl chloride in the presence of benzene, probably according to the reactions:

$CH_3(CH_2)_3CH_2Cl + 2Na \rightarrow CH_3(CH_2)_3CH_2Na + NaCl$
$CH_3(CH_2)_3CH_2Na + C_6H_6 \rightarrow C_6H_5Na + C_5H_{12}$ Other alkyl or aryl halogen compounds, such as butyl chloride or chlorobenzene, can be used in place of the amyl chloride.

The sodium in phenylsodium (or other sodiohydrocarbons) is highly reactive, and is apparently capable of interchanging with an alpha hydrogen of the sodium tertiary-butyl acetate to form sodium alpha-sodio-tertiary-butyl acetate and benzene, according to the probable equation:

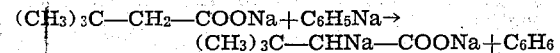

On subsequent carbonation with carbon dioxide, this salt is converted into sodium tertiary-butyl malonate, probably according to the reaction:

On subsequent carbonation with carbon dioxide, this salt is converted into sodium tertiary-butyl malonate, probably according to the reaction:

and upon subsequent acidulation this is converted into the desired tertiary butyl malonic acid.

Example

Metallic sodium (21 grams) is powdered under toluene, which is then siphoned off. The metal is then washed with several portions of benzene. To the metal is now added benzene (45 ml.) and tertiary butyl acetic acid (9.0 g.) dissolved in petroleum ether (10 ml.). To make good stirring possible, more petroleum ether (boiling range 43-65° C.) is added from time to time during an hour (total 95 ml.). To the mixture is now added n-amyl chloride (30 g.), and this is likewise accompanied by the addition of petroleum ether (total 80 ml.) during one and one-half hours. Stirring is then continued for another hour.

The petroleum ether is then distilled off until the inside temperature reaches 64° C.; a portion (50 ml.) of benzene is added and an additional 25 ml. more distillate is collected. The reaction mixture is then refluxed with stirring at 70-75° C. during four hours, and then allowed to cool.

Carbon dioxide gas is then passed into the reaction mixture for a period of forty minutes at temperatures of 44-63° C., during which time 40 ml. of petroleum ether-benzene mixture is again added to facilitate stirring.

The reaction mixture is then cooled, treated with alcohol to decompose excess sodium and finally with sufficient water to dissolve the